July 29, 1930. C. D. BRUNO 1,771,770
BACKWATER TRAP AND FLOOR DRAIN
Filed Sept. 20, 1929
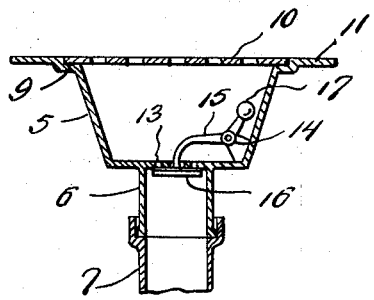
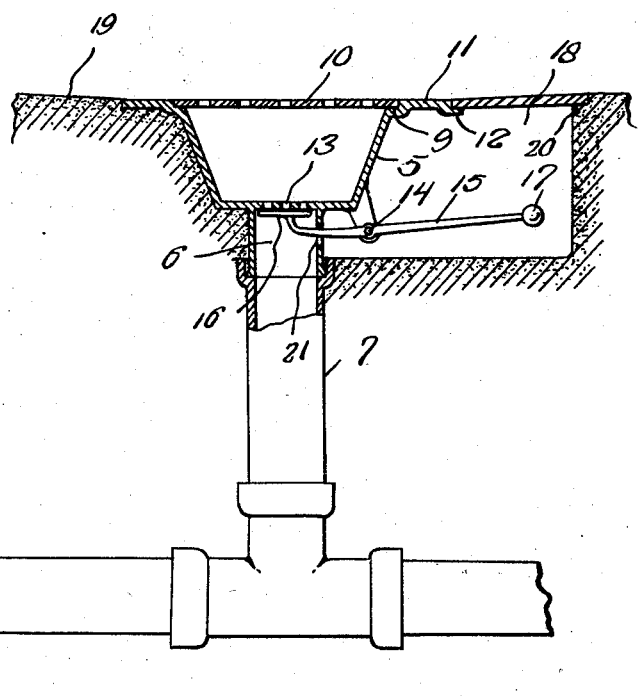
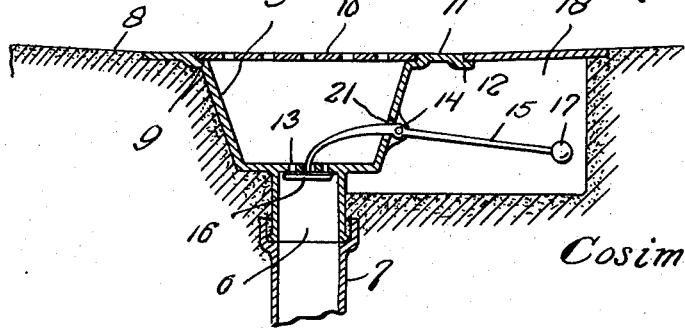
Cosimo D. Bruno,
INVENTOR.
BY J. Stanley Burch
ATTORNEY.

Patented July 29, 1930

1,771,770

UNITED STATES PATENT OFFICE

COSIMO D. BRUNO, OF YOUNGSTOWN, OHIO

BACKWATER TRAP AND FLOOR DRAIN

Application filed September 20, 1929. Serial No. 394,047.

The present invention relates to an improved backwater trap and floor drain of that type wherein a valve is provided to close the outlet of the catch basin to prevent the backing of sewer water through the trap and flooding the premises around the trap.

An object of the invention is to provide a device of the above kind which is efficient in operation, and of simple and cheap construction.

The invention resides in the novel details of construction, and combination and arrangement of parts hereinafter more fully described, shown in the accompanying drawing, and claimed.

In the drawing:

Figure 1 is a view showing an embodiment of the present invention operatively associated with a waste pipe, the trap being in central vertical section;

Figure 2 is a view somewhat similar to Figure 1, showing a modified form of the invention; and Figure 3 is a view somewhat similar to Figure 1, showing a still further modified form of the invention.

Referring in detail to the drawing, 5 indicates a catch basin having an integral bottom outlet nipple 6 for connection with the upper end of the usual waste pipe 7 that leads to a sewer main 8. The catch basin 5 is formed at the top with a continuous upwardly facing shoulder or seat 9 for the usual perforated cover plate 10, and a supporting flange 11 which, in Figures 1 and 2, is formed at one side with a shoulder or seat 12.

The portion of the bottom wall of the catch basin coincident with the nipple 6 is perforated as at 13 to provide an outlet. Pivoted at 14 to one side of the catch basin 5, is a lever 15 having one arm extending into the upper end of the nipple 6 and provided on the laterally directed free inner end thereof with a valve-disk 16 adapted to seat upwardly against the perforated bottom wall portion at 13 to close the outlet of the catch basin. The other arm of lever 15 is counterbalanced by a weight 17 on the free outer end thereof so that the valve-disk 16 is normally lightly seated or closed. This insures ready and quick opening of the valve-disk when water enters the catch basin and falls on the valve-disk to overcome the action of the weight 17, and at the same time insures prompt tight seating of the valve-disk when subjected to back pressure by water backing up in the waste pipe 7. Obviously, when the valve-disk is thus seated, the outlet of the catch basin is effectively closed and backing of the water through the trap and flooding of the surrounding premises is prevented.

In installing the forms of present trap and floor drain shown in Figures 1 and 2, a pocket or chamber 18 is left in the floor 19 at one side of the catch basin to receive the weighted arm of lever 15 and permit free movement thereof, and this chamber is closed at the top by a closure plate supported at one side by the shoulder 12 and at the remaining three sides by a depressed shoulder 20 formed in the floor about the top of the chamber 18.

In the form of the invention shown in Figure 1, the inner arm of lever 15 passes through a slot 21 in the side of the outlet nipple 6, while in Figure 2 the same arm passes through the side of the catch basin and down through the perforated bottom portion of the latter. Such slight leakage as may be had through slot 21 will be negligible, especially if suitable packing means is employed at this point between the inner arm of the lever and the wall of nipple 6. Otherwise, these two forms are substantially alike and the similar parts are indicated by like reference numerals in both views.

In the forms of the invention shown in Figures 1 and 2, the lever 15 is mounted externally of the catch basin, while in Figure 3 said lever is mounted entirely within the catch basin. The last mentioned form may be installed without forming the chamber 18 or slotting the catch basin or its outlet nipple.

Minor changes are contemplated within the spirit and scope of the invention as claimed.

What I claim as new is:

1. A backwater trap and floor drain comprising a catch basin provided with a bottom outlet nipple and having the portion of its bottom wall coincident with the inner end of said nipple perforated to form an outlet thereto, a lever pivoted intermediate its ends to one side of the catch basin externally of the latter, one arm of said lever extending into the upper end of said outlet nipple and having a valve-disk on the free end thereof adapted to seat upwardly against the perforated bottom wall portion of the catch basin to close the outlet of the latter, the other arm of said lever having a weight to counter-balance and normally lightly seat said valve-disk.

2. A backwater trap and floor drain comprising a catch basin provided with a bottom outlet nipple and having the portion of its bottom wall coincident with the inner end of said nipple perforated to form an outlet thereto, a lever pivoted intermediate its ends to one side of the catch basin externally of the latter, one arm of said lever extending into the upper end of said outlet nipple and having a valve-disk on the free end thereof adapted to seat upwardly against the perforated bottom wall portion of the catch basin to close the outlet of the latter, the other arm of said lever having a weight to counter-balance and normally lightly seat said valve-disk, the inner arm of the lever extending through a side of the catch basin above the bottom of the same and directed laterally in a downwardly direction through the perforated bottom wall portion of said catch basin.

3. A backwater trap and floor drain comprising a catch basin provided with a bottom outlet nipple and having the portion of its bottom wall coincident with the inner end of said nipple perforated to form an outlet thereto, a lever pivoted intermediate its ends to one side of the catch basin externally of the latter, one arm of said lever extending into the upper end of said outlet nipple and having a valve-disk on the free end thereof adapted to seat upwardly against the perforated bottom wall portion of the catch basin to close the outlet of the latter, the other arm of said lever having a weight to counter-balance and normally lightly seat said valve-disk, said catch basin having a top flange formed at one side with a seat, the outer arm of the lever being adapted for arrangement in a chamber in the floor separate from and at one side of the catch basin, and a closure plate for said chamber adapted to be partially supported on said seat of said top flange.

4. A backwater trap and floor drain comprising a catch basin provided with a bottom outlet nipple and having the portion of its bottom wall coincident with the inner end of said nipple perforated to form an outlet thereto, a lever pivoted intermediate its ends to one side of the catch basin, one arm of said lever extending into the upper end of said outlet nipple and having a valve-disk on the free end thereof adapted to seat upwardly against the perforated bottom wall portion of the catch basin to close the outlet of the latter, the other arm of said lever having a weight to counter-balance and normally lightly seat said valve-disk.

In testimony whereof I affix my signature.

COSIMO D. BRUNO.